United States Patent [19]

Sauka et al.

[11] 4,278,298
[45] Jul. 14, 1981

[54] BRAKING SYSTEM UTILIZING BOTH A DYNAMIC AND A MECHANICAL BRAKE

[75] Inventors: Klaus Sauka, Crailsheim, Fed. Rep. of Germany; Horst Muschelknautz, deceased, late of Crailsheim,, Fed. Rep. of Germany, by Ingeborg Muschelknautz

[73] Assignee: Voith Turbo GmbH & Co. K.G., Fed. Rep. of Germany

[21] Appl. No.: 44,456

[22] Filed: Jun. 1, 1979

[30] Foreign Application Priority Data

Jun. 7, 1978 [DE] Fed. Rep. of Germany ....... 2824923

[51] Int. Cl.³ ...................... B60T 13/74; F16F 11/00
[52] U.S. Cl. ......................................... 303/3; 188/271
[58] Field of Search ....................... 188/271, 290, 296; 303/3, 15, 16, 17

[56] References Cited

FOREIGN PATENT DOCUMENTS 2,120,743 6/1980 Fed. Rep. of Germany ........... 188/271

Primary Examiner—J. D. Miller
Assistant Examiner—Reinhard J. Eisenzopf
Attorney, Agent, or Firm—Ostrolenk, Faber, Gerb & Soffen

[57] ABSTRACT

A braking system for controlling the speed of a moving member is disclosed. The braking system includes both a dynamic and a mechanical brake whose operation is controlled by a central control circuit. The dynamic brake has a maximum dynamic braking moment which it can apply to the moving member which is defined by a limiting characteristic curve. The central control circuit generates an adjustment signal as a function of the difference of the actual value of the total braking moment applied to the moving member by the dynamic and mechanical brakes and the desired value of the total braking moment. The central control circuit utilizes the adjustment signal in such a manner that the dynamic braking moment applied to the moving member by the dynamic brake is increased or decreased when the actual value of the dynamic braking moment applied to the moving member is less than the maximum value permitted by the limiting characteristic curve and such that the mechanical braking moment applied to the moving member by the mechanical brake is increased or decreased only after the actual value of the total braking moment applied to the moving member by the dynamic and mechanical brake is greater than the maximum dynamic braking moment defined by the limiting characteristic curve.

14 Claims, 2 Drawing Figures

BRAKING SYSTEM UTILIZING BOTH A DYNAMIC AND A MECHANICAL BRAKE

BACKGROUND OF THE INVENTION

The present invention relates to braking systems and more particularly to braking systems incorporating both a dynamic and a mechanical brake. The dynamic brake is preferably a hydrodynamic brake of the kind which includes a control mechanism for adjusting the dynamic braking moment which the dynamic brake applies to a rotating shaft to be braked. The amount of dynamic braking moment which can be obtained by the dynamic brake (as represented by a braking moment/rotary speed diagram) lies inside an operating range which is defined by a limiting characteristic curve for the maximum dynamic braking moment. A control device compares the actual value of a parameter to be controlled (for example, the dynamic braking moment) with an adjustable reference value representative of the desired value of the parameter to be controlled and generates an adjustment value signal which varies as a function of the difference between the actual value and the reference value of the parameter. The adjustment value is applied to the control mechanism of the dynamic brake and controls the operation thereof.

A mechanical brake, which has a control mechanism for adjusting the mechanical braking moment which the mechanical brake applies to the rotating shaft to be braked, is only enabled when the required braking moment exceeds the operating range of the dynamic brake. In this case, the braking moment of the mechanical brake is controlled to be equal to the amount by which the required braking moment exceeds the operating range of the dynamic brake. A braking device of this kind, wherein the dynamic brake is constructed as a hydrodynamic brake, is described in German Patent Specification No. 2,239,008.

As is known, with increasing rotary speed and under otherwise constant conditions, the braking moment produced by a dynamic brake rises according to a parabolic curve. Thus, the characteristic curve which limits the operating range of the dynamic brake in the lower rotary speed range, is a parabola. Above a certain rotary speed, the characteristic curve runs approximately horizontally or rises slightly or falls slightly, since in this range the maximum dynamic braking moment must be kept less than the theoretically possible braking moment so that mechanical or thermal over-loading of the dynamic brake is avoided. As a rule, the dynamic brake should pass through the operating range along specific characteristic curves. A regulating device is provided for this purpose. By way of example, if a hydrodynamic brake is used, the regulating device adjusts the filling level of the hydrodynamic brake.

For this purpose, the known braking device described in the foregoing German Patent Specification has a filling level regulating valve and a device for measuring the dynamic braking moment actually produced. The movable valve component of the filling level regulating valve is constructed as a force comparator which compares a force (the actual value) which is proportional to the actual dynamic braking moment measured, with a force representing the required braking moment (the reference value). If there is a difference between these values, the valve component of the filling level regulating valve is adjusted in such a way that the actual value corresponds to the reference value.

If the rotary speed of the brake rotor decreases so much during a braking operation that the parabolic part of the limiting characteristic curve is exceeded, and the dynamic braking moment which can be obtained is therefore less than the required amount, the mechanical or friction brake must also be utilized. The same may also be the case when the required braking moment lies above the limiting characteristic curve and the rotary speed of the rotor is high. As long as the dynamic brake can produce the required amount of braking moment on its own, the friction brake remains disabled, to keep the wear of the friction surfaces as low as possible.

In the known braking device, the friction brake is automatically switched in as follows. A force corresponding to the actual dynamic braking moment is compared with a force representing a reference value in a three-pressure control valve. If the reference force is greater than the actual force, the control value actuates the operating mechanism of the mechanical brake, i.e. it opens a valve which supplies pressure medium to an operating cylinder in the friction brake so that the mechanical brake actuates. The mechanical brake is preferably actuated in such a way that the braking moment produced by it is as nearly as possible equal to the difference between the required braking moment and the actual dynamic braking moment. In other words, the sum of the braking moments of the friction and dynamic brakes should always be equal to the required amount of braking moment.

In practice, however, it has been found that with this type of combined braking system the desired ideal method of functioning is frequently delayed, at least for a certain time. Very often the mechanical braking moment is at least temporarily higher or lower than is required to supplement the dynamic braking moment. This disadvantage can perhaps be tolerated when braking a vehicle, since in this case the driver of the vehicle can compensate for any possible error by adjusting the brake pedal. However, if, for example, a stationary plant is involved in which the braking device cannot be constantly supervised by operating personnel, the foregoing disadvantage can result in considerable operating problems. Typical examples of such stationary plant are:

(a) a conveyor system comprising several conveyor belts running one behind the other but driven individually. In this instance, when the system is stopped, all the conveyor belts should cover the same braking distance, irrespective of their load; otherwise, there would be a danger that a conveyor belt which was still running would spill some conveyed goods onto the next conveyor belt, which may already be stationary.

(b) a conveyor belt being used for carrying personnel as well as materials. In this instance, official regulations prohibit the exceeding of a specific rate of retardation.

(c) A conveyor belt is conveying material downhill. In this instance, its conveying speed must be held constant by continuous braking, irrespective of variations in loading.

A primary object of the present invention is to provide a combined braking device, comprising a dynamic brake and a mechanical brake, which can adjust to a required operating value, such as a specific amount of braking moment or a specific rotary speed or a specific level of retardation, even during combined dynamic and mechanical braking.

BRIEF DESCRIPTION OF THE INVENTION

The braking system of the present invention utilizes a measuring device, associated with the control device which controls the operation of both the dynamic and mechanical brakes, which measuring device is capable of measuring the actual value of the parameter which is to be adjusted by both the dynamic and mechanical brakes. The dynamic brake has a signal generator associated with it which initiates the supply of a switching signal when the required braking moment exceeds the operating range of the dynamic brake. A switching device is provided which, when the switching signal is present, supplies an adjustment value, whose value varies as a function of the difference between the actual and reference values, to the control mechanism of the mechanical brake. Thus, in accordance with the invention, a measuring device associated with the control device can measure actual values to be adjusted (e.g., actual braking moment) by both brakes jointly. If, for instance, it is necessary to adjust the braking moment to a certain value, then according to the invention it is not the braking moment produced by the dynamic brake alone that is measured (as in the above-described known braking device) but the braking moment produced jointly by both the brakes. As a result, even during a combined braking operation, the total braking moment is controlled in such a way that the sum of the two braking moments is adjusted to the instantaneous value required. However, the friction brake is not brought into operation until the braking moment required is greater than the braking moment which can be produced by the dynamic brake alone. This is accomplished by using a signal generator which detects when the required braking moment exceeds the operating range of the dynamic brake, and a switching mechanism which connects the control device to the mechanical brake, so that this also becomes effective. As such, the adjustment value generated by the control device is supplied part of the time to the operating mechanism of the dynamic brake and part of the time to the operating mechanism of the friction brake. When a switch-over has taken place and the control mechanism of the friction brake has been switched in, the control device temporarily stops controlling the dynamic brake, but the dynamic brake remains active. If a hydrodynamic brake is used, the fluid level therein is maintained. After the switch-over, i.e. during combined braking, the dynamic braking moment may undergo a change, for example, due to changes in rotary speed. During this time, the control device either holds the sum of both amounts of braking moment at the required level, or holds the sum of the amounts of braking moment at a level such that the rotary speed or the retardation rate corresponds to the required value, whichever parameter is being controlled.

As a result of the foregoing, it is possible to compensate during combined braking for disturbing influences such as changes in the coefficient of friction of the mechanical brake (possibly caused by variations in humidity) or changes in the mechanical resistance of the operating mechanism of the mechanism brake. This kind of disturbing influence may well have caused the problems in the known brakes which were mentioned above.

A further important concept of the invention concerns the functioning of the above-mentioned signal generator which confirms that the required braking moment exceeds the operating range of the dynamic brake. This signal generator must in fact be able to generate the signal, which switches in the control mechanism of the mechanical brake, at two different operating conditions, namely:

(a) whenever the rotary speed of the dynamic brake is no longer sufficient to produce the required amount of braking moment, and (b) whenever the mechanical or thermal loading of the dynamic brake exceeds the tolerated level.

To solve this associated problem when the dynamic brake is a hydrodynamic brake, the invention detects whether the pressure in the inlet line of the hydrodynamic brake has exceeded a specific value (indicating the attainment of the parabola, for the maximum filling level) and detects whether the fluid pressure prevailing in the housing of the hydrodynamic brake, which is largely dependent on the rotary speed, has exceeded a specific value (indicating the attainment of the maximum permitted hydrodynamic braking moment). The switching mechanism reacts to either of the two switching signals by switching the control mechanism of the mechanical brake in every instance.

BRIEF DESCRIPTION OF THE DRAWINGS

For the purpose of illustrating the invention there are shown in the drawings several forms which are presently preferred; it being understood, however, that this invention is not limited to the precise arrangements and instrumentalities shown.

DETAILED DESCRIPTION OF THE PREFERRED EMBODIMENT

Figure 1:
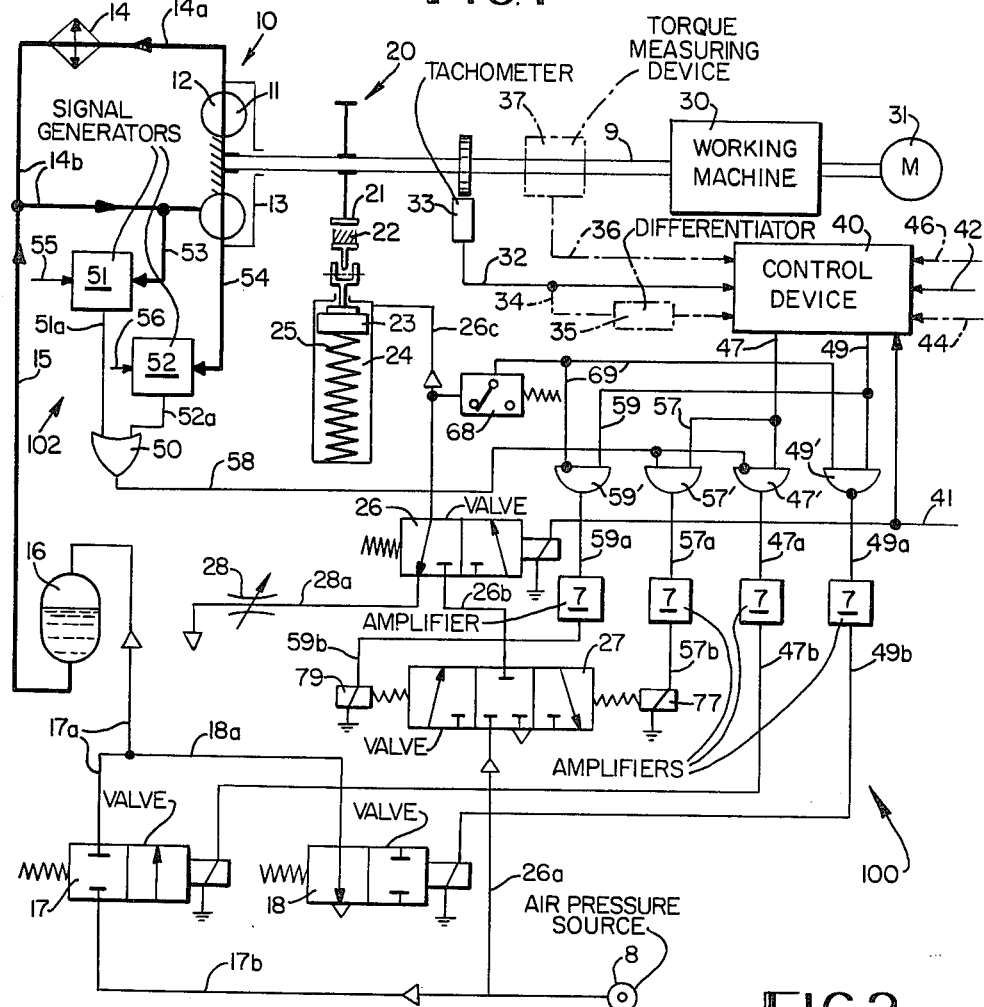
FIG. 1 is a control diagram of a combined braking device with a hydrodynamic brake and a mechanical brake.

Referring now to FIG. 1, there is shown a schematic diagram of a braking system constructed in accordance with the principles of the present invention and designated generally as 100. As noted above, braking system 100 includes both a hydrodynamic brake 10 and a mechanical brake 20, each of which are adapted to brake a rotating member or shaft 9 when enabled. In the embodiment illustrated, shaft 9 forms part of a working machine 30, shown symbolically. By way of example, machine 30 may be a conveyor system which is driven by an electric motor 31.

Fluid brake 10 comprises rotor bucket and stator bucket wheels 11, 12, respectively, which are housed in a brake housing 13, and a cooling circuit comprising an outlet line 14a, a cooler 14 and an inlet line 14b. A filling and draining line 15, which runs from a hydropneumatic expansion chamber or accumulator 16, is connected to inlet line 14b. The level of the air pressure in chamber 16 determines, in a known way, the filling level of the fluid brake 10. The amount of hydrodynamic braking moment depends on both the filling level of brake 10 and the rotary speed of the rotor. A hydrodynamic brake of this type is disclosed in abandoned U.S. application Ser. No. 886,533, filed Mar. 14, 1978, in the name of Klaus Vogelsang and assigned to the assignee of the present invention.

The level of fluid in expansion chamber 16 is determined by the amount of air which is pumped into it by a pressure source 8 which is connected to chamber 16 via a pressure line 17a/17b. An electromagnetically operated open-shut valve 17 determines the amount of air pressure supplied to chamber 16. A discharge line 18a branches off of pressure line 17a and is connected to a second electromagnetically operated open-shut valve 18.

Mechanical brake 20 comprises a brake drum 21 and a brake shoe 22 which is mechanically connected to the piston 23 of a spring-loaded cylinder 24. The spring 25 of this cylinder presses the brake shoe 22 against the brake drum. Whenever compressed air is supplied to piston 23 from source 8 via a pressure line 26a/26b/26c, mechanical brake 20 is released against the force of the spring 25. An electromagnetically switched venting valve 26 and an electromagnetically operated pressure adjustment valve 27 are located in pressure line 26a/26b/26c. When the electromagnet of valve 26 is enabled, spring-loaded cylinder 24 is pneumatically connected to the pressure adjustment valve 27. When the electromagnet of valve 26 is disabled, spring-loaded cylinder 24 is vented via a venting line 28a having an adjustable throttle 28. This arrangement serves to automatically actuate the mechanical brake 20 when there is a power failure.

Pressure adjustment valve 27 has three positions: a central neutral position, a position for increasing the pressure in spring-loaded cylinder 24 (this position being assumed when the electromagnet 79 is enabled) and a position for reducing pressure in cylinder 24 (this position being assumed when electromagnet 77 is enabled).

A control device 40 controls the operation of brakes 10 and 20 as a function of either the rotary speed, the retardation or the braking moment of shaft 9. Since the rotary speed and retardation of the shaft vary as a function of the braking moment applied to the shaft by brakes 10, 20, control device 40 controls the operation of brakes 10, 20 as a function of braking moment in all three cases. If control device 40 is to control the operation of brakes 10, 20 as a function of shaft speed, it receives a first input from tachometer 33 via line 32 and a second input via line 42. The input on line 32 is an "actual value" signal representative of the actual rotational speed of shaft 9. The input on line 42 is a "reference" signal indicative of the desired rotational speed of shaft 9. If, as a result of comparing the actual value and reference signals, control device 40 determines that shaft 9 is rotating too fast or too slow, it will generate "increased braking moment" or "decreased braking moment" signals on lines 47, 49, respectively, to either decrease or increase the rotary speed of shaft 9.

If control device 40 is to control the operation of brakes 10 and 20 as a function of the retardation of shaft 9, the output of tachometer 33 is fed to a differentiator 35 via line 34. Differentiator 35 differentiates the rotary speed signal generated by tachometer 33 and applies this signal to control device 40 as the "actual value" signal. In this case, device 40 receives a "reference" signal on line 44 which is representative of the desired retardation value.

If control device 40 is to control the operation of brakes 10 and 20 as a function of the braking moment of shaft 9, device 40 receives an "actual value" signal via line 36 from torque measuring device 37 and a "reference" signal on line 46. The output of torque measuring device 37 is representative of the actual braking moment of shaft 9 while the "reference" signal on line 46 is representative of the desired value thereof.

In each of the foregoing examples, control device 40 compares the "actual value" and "reference" signals and generates either an "increase braking moment" or "decrease braking moment" signal on lines 47 and 49, respectively, as a function thereof. The increase and decrease braking signals together define an adjustment signal which is applied to either a first control means (i.e., valve 17) or a second control means (i.e., valve 27) as first and second adjustment signals, respectively. The adjustment signal is applied to the valves 17 and 27 via signal routing means including gates 47', 49', 57' and 59'. This operation will be better understood with reference to the following.

Line 47 is connected to one input of both AND gates 47' and 57' (via line 57). The remaining inputs of lines 47' and 57' are coupled to the output of a signal generator 102 (comprising elements 50–56 and described below) via a line 58. In a manner described below, signal generator 102 generates an out-of-range signal on line 58 (as used herein, the presence of a signal will be designated by a binary "1" while the absence of a signal will be designated by a binary "0") whenever the required braking moment of shaft 9 exceeds the operating range of dynamic brake 10.

As shown in FIG. 1, the second input of AND gate 47' receives the signal on line 58 via an inverting input. As such, AND gate 47' generates a binary "1" on its output only when control device 40 generates an "increase braking moment" signal on line 47 and signal generator 102 does not generate an out-of-range signal on line 58. Since the second input to AND gate 57' is non-inverting, AND gate 57' generates a binary "1" on its output whenever control device 40 generates an "increase braking moment" signal and signal generator 102 generates an out-of-range signal.

The output of AND gate 57' is applied via line 57a to power amplifier 7 whose output of applied to electromagnet 77 of pressure adjustment valve 27 via line 57b. The output of AND gate 47' is applied via line 47a to amplifier 7 whose output is applied to the electromagnet of valve 17 via line 47b. Accordingly, electromagnet 77 will be enabled (thereby decreasing pressure in cylinder 24 and increasing the braking moment of mechanical brake 20) whenever control device 40 generates an "increase braking moment" signal and signal generator 102 generates an out-of-range signal while the electromagnet of valve 17 will be enabled (so as to increase the dynamic braking moment of brake 10) whenever control device 40 generates an "increased braking moment" signal and signal generator 102 does not generate an out-of-range signal.

Line 49 is connected to first inputs of AND gates 49' and 59' (via line 59). The second inputs of gates 49', 59' are coupled to the output of pressure switch 68. Pressure switch 68 is connected to the compressed air line 26c and applies a signal (a binary "1") to line 69 whenever a specific pressure within cylinder 24 is exceeded (such pressure indicating that the friction brake 20 is completely released). Since the second input of AND gate 59' is an inverting input, AND gate 59' generates a binary "1" at its output whenever control device 40 generates a "decrease braking moment" signal on line 49 and pressure switch 68 does not generate a signal on line 69. Since the output of AND gate 49' is inverted, AND gate 49' generates a binary "1" at its output at all times except when control device 40 generates a "decrease braking moment" signal on line 49 and pressure switch 68 generates an output signal on line 69.

The output of AND gate 59' is applied via line 59a to amplifier 7 whose output is applied to the electromagnet 79 of pressure adjustment valve 27 via line 59b. As such, electromagnet 79 will be enabled (thereby increasing pressure in cylinder 24) whenever control device 40 generates a "decrease braking moment" signal on line 49 and pressure switch 68 does not generate a signal on line 69.

The output of AND gate 49' is inverted and is applied via line 49a to an amplifier 7 whose output is applied via line 49b to the electromagnet of valve 18. As such, the electromagnet of valve 18 will be enabled at all times (and valve 18 will be off) except when the output of control device 40 generates a "decrease braking moment" signal and pressure switch 68 generates an output on line 69 (indicating brake 20 is disengaged).

FIG. 1 illustrates the condition of braking system 100 when shaft 9 is stationary. In this case, the friction brake 20 is applied by the spring 25 and the expansion chamber 16 is pressure-free, i.e., the fluid brake 10 is drained. Before starting up the conveyor system 30, assuming that a monitoring device indicates that the system is ready for operation, voltage is applied to the line 41, enabling the electromagnet of venting valve 26 and causing venting valve 26 to connect cylinder 24 to line 26b. The application of voltage to line 41 is interpreted by control device 40 as a command to release the friction brake 20. The control device therefore initiates, via line 49 and the lines 59, 59a, 59b, a temporary excitation of electromagnet 79, whereby compressed air is supplied to piston 23 causing brake 20 to be released. At the same time, via the inverting output of AND gate 49', the electromagnet of the valve 18 is excited and the drainage line 18a is therefore closed off (ready state). Only when shaft 9 is stationary or when a signal (a binary "1") is applied to both the inputs of AND gate 49' does valve 18 assume the position shown. This ensures that in the event of power failure (which also disables control device 40) the hydrodynamic brake 10 is disabled. In such an event, the mechanical brake 10 should be enabled with a fixed amount of braking moment, preferably the maximum permitted braking moment. In this way, overloading of the shaft 9 by a possible simultaneous maximum application of both the brakes 10 and 20 is avoided.

During operation of brakes 10, 20, the actual value signal applied to control device 40 is compared constantly with the reference value signal. If, for example, the actual value signal is smaller than the reference value signal, and therefore the actual value of the braking parameter is too low, the braking moment should be increased. In such a case, control device 40 generates an adjustment value signal on line 47 which varies as a function of the difference between the actual value and reference value signals in the form of an electrical current which has a specific time frequency and a specific time ratio. This current effects a temporary excitation of the electromagnet of valve 17 via lines 47a and 47b. As a result, the braking moment produced by the fluid brake 10 is increased, as explained above. When the required braking moment exceeds the operating range of the fluid brake 10, signal generator 102 generates an out-of-range signal (a binary "1") on line 58. As a result, the signal appearing on line 47 is no longer applied to line 47a, and is instead applied to line 57a. Two things are achieved by this:

(1) the magnet of the valve 17 remains switched off and that of the valve 18 switched on, i.e., both valves 17 and 18 remain in the closed position, so that the filling level established in the fluid brake 10 when said signal appears in the line 58, is maintained (until either the signal in the line 58 disappears or a signal is applied to both the inputs of the AND element 49'); and (2) a temporary excitation of the electromagnet 77 of the pressure adjustment valve 27 is initiated and with it controlled loading of the friction brake 20 by means of the spring 25, in that controlled venting of the cylinder 24 takes place via the lines 26c and 26b.

Conversely, if the actual value signal is greater than the reference value signal, and the braking moment should be reduced, an adjustment value signal appears on line 49, this signal being an adjustment value which again depends on the difference between the actual value and the reference value signals. If at this instant the friction brake 20 is enabled, electromagnet 79 of the pressure adjustment valve 27 is enabled in order to reduce the mechanical braking moment. If this releases the friction brake 20 completely, the pressure switch 68 generates a signal on lines 69 which is applied to AND gates 49' and 59'. If the actual value signal is still greater than the reference value signal, the inverting output of AND gate 49' causes a temporary return of the valve 18 to the open rest position, thereby producing a controlled reduction of the braking moment of the fluid brake 10. Simultaneously, the signal on lines 69, as applied to the inverting input of AND gate 59', prevents the signal on line 49 from reaching electromagnet 79. This is unnecessary, as the friction brake 20 is already completely released.

The signal generator 102 is arranged on the fluid brake 10 and comprises two pressure signal generators 51 and 52, the outputs of which are connected via an OR gate 50 to line 58. Pressure generator 51 is connected via a pressure measuring line 53 to inlet line 14b of fluid brake 10 and compares the fluid pressure in line 14b with a reference value applied to signal generator 51 via a line 55. This reference value corresponds to the fluid pressure which prevails in the inlet line 14b when the fluid brake 10 has reached its maximum filling level. When the fluid pressure in brake 10 reaches this level, pressure signal generator 51 generates a signal on line 51a which is applied to AND gates 57' and 47' via OR gate 50 and line 58. In a corresponding manner, the pressure signal generator 52 is connected via a pressure measuring line 54 to the radially outer region of the brake housing 13. The fluid pressure in housing 13 is compared with a reference value applied to signal generator 52 via a line 56 and corresponds to the maximum permitted fluid pressure in the brake housing 13. When this pressure is reached, pressure signal generator 52 generates a signal on line 52a which is applied to AND gates 57' and 47' via OR gate 50 and line 58.

In the foregoing embodiment of the present invention, valves 17 and 18 and chamber 16 cooperate to form a first control means which controls the dynamic moment applied by brake 10 to shaft 9 as a function of a first adjustment signal (the combination of signals on lines 47b and 49b) applied thereto by a central control means including control device 40, tachometer 33, signal generator 102, pressure switch 68, gates 47', 49', 57', 59' and amplifier 7. Similarly, the valves 26, 27 and the piston 24 cooperate to form a second control means which control the dynamic moment applied by brake 20 to shaft 9 as a function of a second adjustment signal (the combination of signals on lines 57b and 59b) applied thereto by the central control means.

The operation of the control device 40 and the signal generator 102 will now be described with reference to the braking moment/rotary speed diagram shown in FIG. 2. In this diagram the braking moment M (that is, the dynamic braking moment produced by the fluid brake 10 and the additional braking moment produced by the friction brake 20, if applicable) is shown plotted against the rotary speed n of the shaft 9.

The parabolic characteristic curve for the maximum filling level of the fluid brake 10 is designated 60. This parabolic forms the limiting characteristic curve in the lower rotary speed range for the maximum dynamic braking moment which can be obtained. The upper part of the parabola 60 is shown only with a dashed line. In the upper rotary speed range the maximum obtainable dynamic braking moment is determined by the fluid pressure permitted in the radially outer region of the housing 13 of the fluid brake 10, which gives approximately the limiting characteristic curve designated 61. This, together with the parabola 60 and with a vertical line 64 which lies at the maximum permitted rotary speed, defines the limits of the operating range of the fluid brake 10. This operating range is indicated with cross hatching in FIG. 2.

Figure 2:
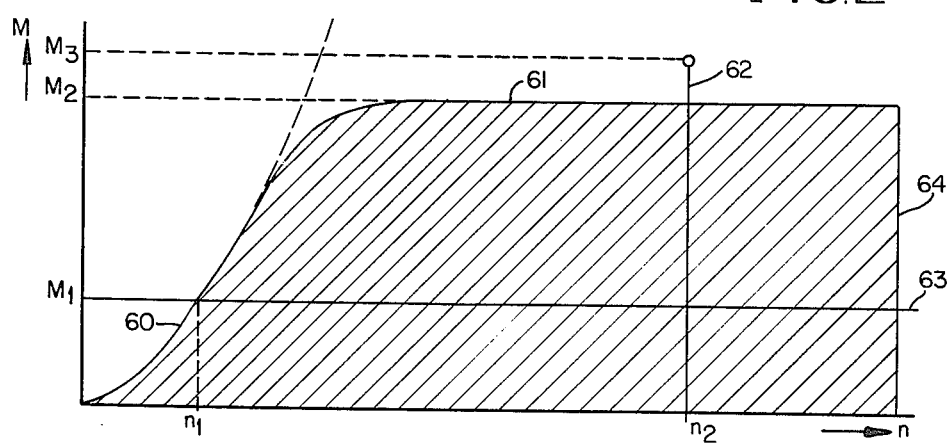
FIG. 2 is a braking moment/rotary speed diagram for the hydrodynamic brake shown in FIG. 1.

If a specific rotary speed, approximately the rotary speed $n_2$, is to be established by the braking device, for example, for a conveyor belt which is conveying downhill, then varying amounts of braking moment, determined by the loading of the conveyor belt, must be produced which all lie on a perpendicular line 62 in FIG. 2. These different amounts of braking moment are established by control device 40, in that the latter actuates the valves 17 and 18 in the manner described, and thereby adjusts the pressure in the hydraulic fluid expansion chamber 16, which results in a change in the filling level of the fluid brake 10. If, for example, the required braking moment is equal to $M_3$, and is therefore greater than the greatest dynamic braking moment $M_2$ which can be achieved with the rotary speed $n_2$, then the fluid pressure measured by the pressure signal generator 52 exceeds the permitted value. As described above, the mechanical brake 20 is thereby actuated in addition to the fluid brake 10. The braking moment of mechanical brake 20 is then equal to the difference $M_3$ minus $M_2$. In this state, the filling level of the fluid brake 10 remains constant. The dynamic braking moment $M_2$ also remains at the same level, because the rotary speed $n_2$ is held constant.

If the machine 30 is to be brought to a stop by the braking device, for example by a constant braking moment $M_1$, the following sequence occurs. At first, the fluid brake 10 is capable of producing the desired braking moment $M_1$ on its own. As the rotary speed decreases, the operating point of the system travels towards the left on a horizontal line 63. When the operating point reaches the limiting characteristic curve 60, 61. The fluid brake 10 has reached its maximum filling level. A further increase of the pressure in the expansion chamber 16 and therefore in the inlet line 14b, results in the pressure signal generator 51 becoming operative. The signal produced by generator 51 initiates the switching in of the mechanical brake 20. As the rotary speed drops further, the amount of hydrodynamic braking moment becomes steadily smaller. However, the control device 40 ensures that there is a corresponding rise in the mechanical braking moment.

In the diagrammatic example shown in FIG. 1, the control device 40 controls the operating mechanisms of the two brakes 10 and 20, thus the valves 17, 18 and 27, with digital signals. This changes the air pressure in the lines 17a and 26b/26c in steps. However, the braking effect of the two brakes 10 and 20 varies substantially continuously, since the expansion chamber 16 and the cylinder 24 act as damping elements. The advantage of this method of control is that, for example, simple open-shut valves 17, 18 can be used as the operating mechanisms for the fluid brake 10.

This is not the case when the filling level of the fluid brake 10 is controlled by means of a control valve arranged in a line for the working fluid, and when therefore there is no expansion chamber. In this case, it is expedient to use a control valve which has a movable valve component which can occupy any intermediate position, as desired. For example, a so-called servo-valve or a proportional valve could be used. In this case, the control device must actuate the control valve by means of an analogue, i.e. smoothly changing, electrical signal. However, this method may also be used to control the pneumatically actuated friction brake or in conjunction with a pneumatic fluid brake which is controlled via an expansion chamber.

The present invention may be embodied in other specific forms without departing from the spirit or essential attributes thereof and, accordingly, reference should be made to the appended claims, rather than to the foregoing specification, as indicating the scope of the invention.

What is claimed is:

1. A braking system for controlling the speed of a moving member, said braking system comprising:
   a dynamic brake, the maximum value of the dynamic braking moment which said dynamic brake can apply to said moving member being defined by a limiting characteristic curve which varies as a function of the rotary speed of said dynamic brake;
   a first control means for adjusting the dynamic braking moment said dynamic brake applies to said moving member as a function of a first adjustment signal applied thereto;
   a mechanical brake;
   second control means for adjusting the mechanical braking moment said mechanical brake applies to said moving member as a function of a second adjustment signal applied thereto;
   signal generating means for generating an out-of-range signal when said dynamic braking moment applied to said moving member by said dynamic brake reaches said maximum value; and
   central control means for generating said adjustment signals as a function of the difference between the actual value of the total braking moment applied to said moving member by both said dynamic and mechanical brakes and a desired value of the total braking moment to be applied to said moving member by both said dynamic and mechanical brakes, said central control means applying said first and second adjustment signals to said first and second control means, respectively, in such a manner that said dynamic braking moment applied to said moving member by said dynamic brake is increased or decreased when the actual value of said dynamic braking moment applied to said moving member is less than said maximum value and such that the mechanical braking moment applied to said moving member by said mechanical brake is increased or decreased only when the actual value of the braking moment applied to said moving member by said dynamic brake is equal to said maximum value.

2. A braking system according to claim 1 wherein said dynamic brake is a hydrodynamic brake and said dynamic braking moment is controlled by the fluid level therein, said central control means causing said first control means to retain said fluid level at a set value after the generation of said out-of-range signal.

3. A braking system according to claim 2 wherein said hydrodynamic brake includes a bucket wheel enclosed in a housing having an inlet and an outlet fluid line coupled thereto and wherein said signal generating means comprises:
(A) first pressure signal generator means connected to said inlet fluid line for generating said out-of-range signal when the pressure in said inlet fluid line exceeds a predetermined value indicating that at least one portion of said limiting characteristic curve has been reached; and
(B) second pressure signal generator means connected to said housing for generating said out-of-range signal when the pressure in said housing exceeds a second predetermined value indicating that at least a second portion of said limiting characteristic curve has been reached.

4. A braking system according to claim 1 wherein said dynamic brake is a hydrodynamic brake which includes a bucket wheel enclosed in a housing having an inlet and an outlet fluid lines coupled thereto and wherein said signal generating means comprises:
(A) first pressure signal generator means connected to said inlet fluid line for generating said out-of-range signal when the pressure in said inlet fluid line exceeds a predetermined value indicating that at least one portion of said limiting characteristic curve has been reached; and
(B) second pressure signal generator means connected to said housing for generating said out-of-range signal when the pressure in said housing exceeds a second predetermined value indicating that at least a second portion of said limiting characteristic curve has been reached.

5. A braking system according to claims 2, 3 or 4, wherein:
(A) said first control means includes a first valve means having increase braking moment, decrease braking moment and neutral positions for causing said dynamic braking moment to increase, decrease or remain the same, respectively, said first valve means having increase braking moment and decrease braking moment inputs which cause said first valve means to move into said increase and decrease braking moment positions, respectively, when first and second enabling signals are applied to its increase and decrease braking moment inputs, respectively, said first and second enabling signals defining said first adjustment signal;
(B) said second control means includes a second valve means having increase braking moment, decrease braking moment and neutral positions for causing said mechanical braking moment to increase, decrease or remain the same, respectively, said second valve means having increase and decrease braking moment inputs which cause said second valve means to move into said increase and decrease braking moment positions, respectively, when third and fourth enabling signals are applied to its increase and decrease braking moment inputs, respectively, said third and fourth enabling signals defining said second adjustment signal; and
(C) said central control means:
(1) applying said first and second enabling signals to said increase or decrease braking moment inputs of said first valve means, respectively, when said actual value of said total braking moment is less than or greater than said desired value of said total braking moment, respectively, and said actual value of said dynamic braking moment is less than said maximum dynamic braking moment; and
(2) applying said third and fourth enabling signals to said increase or decrease braking moment inputs of said second valve means, respectively, when said actual value of said total braking moment is less than or greater than said desired value of said total braking moment, respectively, and said actual value of said dynamic braking moment is greater than said maximum dynamic braking moment.

6. A braking system according to claim 5, wherein said mechanical brake is a friction brake which is spring loaded to engage said moving member and which disengages said moving member when pressure is applied to said friction brake to oppose the force of said spring and further including friction brake released means for preventing said central control means from causing said second control means to decrease the pressure applied to said friction brake once said pressure applied to said friction brake reaches a level indicating that said friction brake has disengaged said moving member.

7. A braking system according to claim 6, wherein said friction brake released means generates a friction brake released signal whenever said friction brake is disengaged from said moving member, said friction brake released signal preventing said central control means from causing said second control means to reduce said pressure applied to said friction brake.

8. A braking system according to claim 7, wherein said friction brake released signal causes said central control means to apply said first adjustment signal to said first valve means and not to apply said second adjustment signal to said second valve means.

9. A braking system according to claim 5, wherein said central control means comprises:
(A) comparing means for comparing said actual value of said total braking moment applied to said moving member to a desired value of said total braking moment applied to said moving member and for generating an increase braking moment and a decrease braking moment signal, respectively, when said actual value of said total braking moment is less than or greater than said desired value of said total braking moment, respectively; and
(B) signal routing means for:
(1) applying said increase and decrease braking signals to said increase and decrease braking moment inputs, respectively, of said first valve means as said first and second enabling signals, respectively, whenever said actual value of said dynamic braking moment is less than said maximum value of said dynamic braking moment; and
(2) applying said increase and decrease braking signals to said increase and decrease braking moment inputs, respectively, of said second valve means as said third and fourth enabling signals, respectively, whenever said actual value of said dynamic braking moment is equal to said maximum value of said dynamic braking moment.

10. A braking system according to claim 9, wherein said mechanical brake is a friction brake which is spring loaded to engage said moving member and which disengages said moving member when pressure is applied to said friction brake to oppose the force of said spring and wherein said signal routing means further includes friction brake released means for generating a friction brake released signal whenever said friction brake is disengaged from said moving member, said friction brake released signal causing said routing means to apply said increase and decrease braking signals to said first valve means exclusive of said second valve means.

11. A braking system according to claim 10, wherein said out-of-range signal causes said routing means to apply said increase and decrease braking signals to said second valve means to the exclusion of said first valve means.

12. A braking system according to claim 1, wherein said central control means includes:
(A) means for generating a control signal as a function of said difference between said actual value of the total braking moment applied to said moving member by both said dynamic and mechanical brakes and a desired value of the total braking moment to be applied to said moving member by said dynamic and mechanical brakes; and
(B) signal routing means for:
(1) applying said control signal to said first control means as said first adjustment signal when the actual value of said dynamic braking moment is less than said maximum dynamic braking moment; and
(2) applying said control signal to said second control means as said second adjustment signal when said actual value of said dynamic braking moment is greater than said maximum dynamic braking moment.

13. A braking system for controlling the speed of a moving member, said braking system comprising:
a dynamic brake, the maximum value of the dynamic braking moment which said dynamic brake can apply to said moving member being defined by a limiting characteristic curve which varies as a function of the rotary speed of said dynamic brake;
a first control means for adjusting the dynamic braking moment said dynamic brake applies to said moving member as a function of an adjustment signal which may be applied to said first control means;
a mechanical brake;
second control means for adjusting the mechanical braking moment said mechanical brake applies to said moving member as a function of said adjustment signal which may be applied to said second control means;
signal generating means for generating an out-of-range signal when said dynamic braking moment applied to said moving member by said dynamic brake reaches said maximum value; and
central control means for generating said adjustment signal as a function of the different between the actual value of the total braking moment applied to said moving member by both said dynamic and mechanical brakes and a desired value of the total braking moment to be applied to said moving member by both said dynamic and mechanical brakes, said central control means applying said adjustment signal to said first and second control means, respectively, in such a manner that said dynamic braking moment applied to said moving member by said dynamic brake is increased or decreased when the actual value of said dynamic braking moment applied to said moving member is less than said maximum value and such that the mechanical braking moment applied to said moving member by said mechanical brake is increased or decreased only when the actual value of the braking moment applied to said moving member by said dynamic brake is equal to said maximum value.

14. A braking system for controlling the speed of a moving member, said braking system comprising:
a dynamic brake, the maximum value of the dynamic braking moment which said dynamic brake can apply to said moving member being defined by a limiting characteristic curve which varies as a function of the rotary speed of said dynamic brake;
a first control means for adjusting the dynamic braking moment said dynamic brake applies to said moving member as a function of an adjustment signal which may be applied to said first control means;
a mechanical brake;
second control means for adjusting the mechanical braking moment said mechanical brake applies to said moving member as a function of said adjustment signal which may be applied to said second control means;
signal generating means for generating an out-of-range signal when said dynamic braking moment applied to said moving member by said dynamic brake reaches said maximum value; and
central control means for generating said adjustment signal as a function of the difference between the actual value of the total braking moment applied to said moving member by both said dynamic and mechanical brakes and a desired value of the total braking moment to be applied to said moving member by both said dynamic and mechanical brakes, said central control means applying said adjustment signal to said first and second control means, respectively, in such a manner that said adjustment signal is applied to said first control means when the actual value of said dynamic braking moment applied to said moving member is less than said maximum value and such that said adjustment signal is applied to said second control means only when the actual value of said dynamic braking moment applied to said moving member is equal to said maximum value.

* * * * *